Oct. 22, 1929.    O. MAYR    1,732,977

CIRCUIT PROTECTION

Original Filed March 3, 1926

Inventor:
Otto Mayr,
by *Alexander S. [signature]*
His Attorney.

Patented Oct. 22, 1929

1,732,977

UNITED STATES PATENT OFFICE

OTTO MAYR, OF KARLSHORST, GERMANY, ASSIGNOR TO GENERAL ELECTRIC COMPANY, A CORPORATION OF NEW YORK

CIRCUIT PROTECTION

Application filed March 3, 1926, Serial No. 92,093, and in Germany April 4, 1925. Renewed March 26, 1929.

My invention relates to circuit protection and more particularly to improvements in protective systems and apparatus for controlling an electric circuit on the occurrence of abnormal conditions with a discriminating action dependent on the distance between the point of fault and some other point, that is, a characteristic of the impedance of the circuit, by which I mean the resistance, the reactance or the impedance between two points, whereby a faulty portion or section of the circuit can be disconnected selectively without interrupting continuity of service on the remainder of the circuit.

My invention will be better understood from the following description taken in connection with the accompanying drawing and its scope will be pointed out in the appended claims.

Figure 1:
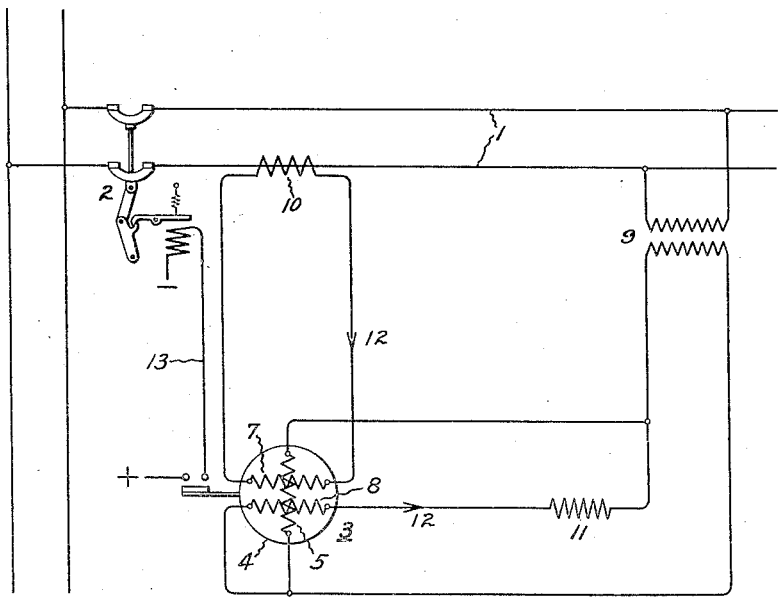
Figure 2:
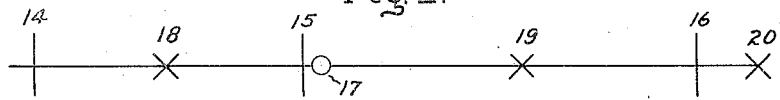
Figure 3:
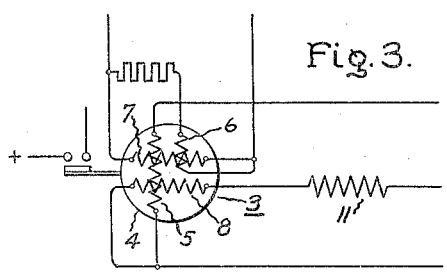
Figure 4:
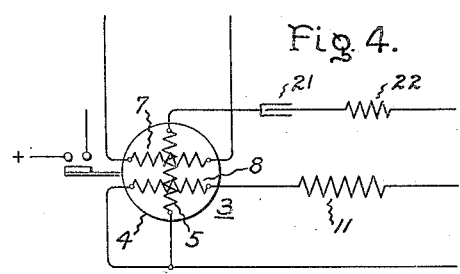
Figure 5:
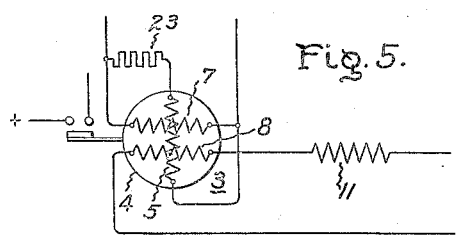

In the accompanying drawing, Fig. 1 illustrates diagrammatically electric circuit protective apparatus embodying my invention, Fig. 2 is a single line drawing, for explanatory purposes, of a part of a sectionalized electric circuit, and Figs. 3, 4 and 5 illustrate modifications of my invention.

At any point of an electric line or circuit, on the occurrence of a fault such as a metallic short circuit, there exists between two electric quantities of the circuit such as the potential, E, and the current, I, and an electric characteristic, W, of the circuit such as the resistance, reactance or impedance between such point and the fault point, the relation $\frac{E}{I} = W$. This is true because the voltage at any point disappears or is consumed between such point and the fault point. If the fault is located within a protected portion or section of the line, the value of W can never be greater than the value W' of the same characteristic for the whole section. If, however, $\frac{E}{I}$ is greater than W', the fault must be located in another section.

In accordance with my invention, I utilize these facts to detect and cut out selectively a faulty circuit 1 or section thereof through a circuit breaker 2 controlled by relatively simple apparatus 3, one form of which is diagrammatically illustrated in Fig. 1. The apparatus as illustrated comprises a movable member 4 and actuating means therefor comprising a winding 5 connected to be energized in accordance with the potential of the circuit, and means comprising windings 7 and 8 which are arranged to cooperate with the winding 5 and are connected to be energized so as to produce a resultant effect dependent on the difference between a current proportional to the circuit current and a current dependent on the potenial of the circuit and a characteristic of the impedance of the circuit to be protected.

The apparatus 3 may take the form of an induction disc or wattmeter type of device or relay, wherein the movable member 4 is the disc which is arranged to be driven in a manner well known to the art by a motor element comprising magnetic members, not shown, between the poles of which the disc is rotatably mounted, and the cooperating windings 5, 7 and 8. The winding 5 is connected in shunt relation with the circuit 1 through a potential transformer 9. The winding 7 is connected in series relation with the circuit 1 through the current transformer 10, and the winding 8 is connected in series with a device 11 across the secondary of the potential transformer 9. The device 11 may comprise a coil or winding having a resistance, reactance or impedance, $w$, proportional to the corresponding characteristic of the circuit or a portion thereof, to be protected. The windings 7 and 8 are arranged normally to oppose, as indicated by the arrows 12, that is, their resultant effect is dependent on the difference between the currents flowing in the windings. The current I in the winding 7 is, of course, dependent on the current in the circuit 1 and the current $i$ in the winding 8 will be $\frac{E}{w}$.

There is, therefore, exerted on the disc 4 a force, or in effect a torque, $$T = KE(I-i) = KE\left(I - \frac{E}{w}\right),$$

K being a proportionality factor dependent on the constants of the design. This torque tends to turn or deflect the disc in a direction dependent on whether $\left(I-\dfrac{E}{w}\right)$ is positive or negative. Assuming that the parts of the apparatus or relay 3 are so connected and arranged that when $(I-i)$ is positive the disc tends to move in a direction to close contacts in the trip circuit 13 of the circuit breaker 2 but that when $(I-i)$ is negative, the disc tends to move in the opposite direction against a stop or the like, then the relay will operate to release the circuit breaker only in case of a fault in the line section with which the relay is associated. This will be considered with the aid of Fig. 2 on the supposition that $w$ corresponds to the ohmic resistance, reactance or impedance of the line or parts thereof under different cases, that is, normal conditions and abnormal conditions in different line sections.

Fig. 2 represents in diagrammatic form a sectionalized electric circuit in which 14, 15 and 16 are stations which may be provided with protective apparatus or relays embodying my invention. The circle 17 on the right of station bus 15 is intended to represent protective apparatus such as that shown in Fig. 1. At station 15, the relay 17 is depended on only for the protection of the section 15—16; $w$ being the ohmic resistance, reactance or impedance of this section. Under normal conditions, then $\dfrac{E}{w}$ corresponds to the current which would flow if the section 15—16 were short-circuited at the end, that is, near station 16, and the full line potential were energizing the relay. Consequently, in any case, $\dfrac{E}{w}$ is greater than the working current I, so that independently of the direction of energy $\left(I-\dfrac{E}{w}\right)$ is negative, and therefore T is negative.

In case of a short-circuit as at 19 within the section 15—16 to be protected, $\dfrac{E}{I}=w'$, in which $w'$ corresponds to the ohmic resistance or impedance of the portion 15—19 of the section 15—16. Since $w'$ is smaller than $w$, which corresponds to the whole of the section 15—16, then $\dfrac{E}{w}=\dfrac{Iw'}{w}$ is less than I. Therefore, the torque T is positive since $\left(I-\dfrac{Iw'}{w}\right)$ is positive and the relay operates to trip the circuit breaker.

In case of a short-circuit outside of the section 15—16 as at the point 20, then $E=Iw''$; in which $w''$ corresponds to the ohmic resistance, reactance or impedance of the line from 15 to 20, that is, from the relay to the fault point. Since $w''$ is greater then $w$, the torque T is negative inasmuch as $\left(I-\dfrac{Iw''}{w}\right)$ is negative. Consequently, the movable member 4 of the relay is not turned in a direction to trip the circuit breaker 2.

In case of a fault such as a short-circuit at 18 in another adjacent line section 14—15, the current flowing to the fault point, as compared to the cases heretofore considered, reverses its direction with respect to the line potential. Therefore, the torque T is negative, since $\left(-I-\dfrac{E}{w}\right)$ is negative independently of the potential E. Consequently, the movable member 4 of the relay is not turned in a direction to trip the circuit breaker.

The movable member 4 of the relay is therefore moved in a direction to complete its control circuit only when the fault is located within the line section to be protected, that is, in the cases considered, the section 15—16 with which the relay 17 is associated.

The installation of an over-current relay is not necessary. On the contrary, by suitably designing the windings, the relay 3 will operate on the occurrence of a fault such as a short-circuit, even though the fault current is smaller than the load current. It is, therefore, possible to give the relay a relatively high current setting or pick-up point for large load conditions without the necessity of altering the adjustment of the relay for the relatively small fault currents to be expected, for example, during the night, that is, light load conditions.

The phase relation of the currents in the relay windings 7 and 8 may be varied by means of known devices such as resistances, inductances, etc., so that the relay operates on the difference between the effective or wattless components of the currents or some components between them. Since, in case of an arc-over fault, the ohmic resistance is not definite, the relay is preferably so adjusted that the inductive resistance or inductance $x$ between the relay and the fault point is the determining factor in the relay operation.

While I have shown two windings 7 and 8, it is to be understood that my invention is not limited to such an arrangement, but includes an arrangement in which a single winding is energized by the current difference, $(I-i)$.

With the winding 5 connected for energization by the potential of the circuit, the relay torque disappears when the potential becomes zero and the relay might fail to operate for a fault substantially at the point where the winding is connected. To avoid this, there may be provided means which will close the contacts when the potential is substantially zero and the torque disappears. Such means can be a biasing spring. In Fig. 3, I have shown such means as consisting of a winding 6. This winding is connected in any suitable manner to produce an effect in accordance with the current in the circuit and cooperates with the current winding 7 to produce a torque to close the contacts if the potential is zero. When the potential is not zero, the effect of an additional winding or a spring is solely to decrease the sensitiveness of the relay for movement in the direction opposite to that for tripping, since the counter torque of the additional winding or spring has to be overcome. Instead of using such means as cause this decrease in sensitiveness, the potential winding 5 may be connected as shown in Fig. 4 in an oscillatory circiut comprising, for example, a capacitance 21 and an inductance 22. The current of this circuit continues to oscillate for several cycles after the potential has become zero, so that the winding 5 is sufficiently energized to produce in cooperation with the windings 7 and 8 a torque for controlling the contacts.

The winding 5, instead of being connected to be energized by the potential of the circuit, as illustrated in Figs. 1, 3 and 4, may be connected to be energized by the current of the circuit as illustrated in Fig. 5, suitable phase displacing means, such as a resistance 23, being connected in circuit with the winding. In this case, the torque $T = KI\left(I - \dfrac{E}{w}\right)$.

This becomes, in case of a fault, $T = KI^2 \left(1 - \dfrac{w'''}{w}\right)$ where $w'''$ represents the impedance characteristic of the circuit between the relay and the fault point. From this it is clear that the directional action is dependent only on the relative values of $w$ and $w'''$. The relay will then have ample torque in case of a fault which reduces the potential to zero, and will operate correctly for a predetermined direction of flow of power. The directional action of the relay, however, in case of flow of power in the opposite direction, is sacrificed. Thus, referring to Fig. 2, and assuming direction of flow of power from station 14 to station 15 to station 16, the relay 3 at 17 will operate correctly for faults at points 19 and 20, but for a fault at station 18 causing a reversal of power at station 15, the relay would operate to cut out the section 15—16. To avoid this in systems where a reversal of power is possible, a power directional relay may be used in conjunction with the relay 3, the contacts of the two relays being arranged in series.

In case of a failure of operation, either of a rely or a circuit breaker on the occurrence of a fault, the opening of the circuit breakers in adjacent sections will not be effected and therefore the faulty section not isolated. For this reason, there may be placed at each end of a line section another relay in conjunction with the relay shown in Fig. 1. This other relay has a delayed time action as compared with the relay 3 and is operative to control the circuit breaker only when the fault is in an adjacent line section and the relay 3 of that section has failed to operate. The value of $w$ for this other relay will correspond to the ohmic resistance, reactance or impedance of the line section with which it is associated and the adjacent line section. The two relays may be combined to form one relay.

What I claim as new and desire to secure by Letters Patent of the United States is:

1. Electric circuit protective apparatus comprising a movable member, and actuating means therefor comprising a winding connected to be energized from the circuit, and means arranged to cooperate with said winding and connected to be energized in accordance with the difference between a current proportional to the circuit current and a current dependent on the potential of the circuit and a characteristic of the impedance of the circuit to be protected.

2. Electric circuit protective apparatus comprising a movable member and electromagnetic means for exerting thereon a force proportional to the product of the potential of the circuit and the difference between the circuit current and a current dependent on the potential of the circuit and a characteristic of the impedance of the circuit to be protected.

3. Electric circuit protective apparatus comprising a rotatable member and means comprising a motor element having a plurality of cooperating windings connected and arranged to exert on the member a torque proportional to the potential of the circuit and the difference between the current of the circuit and a current directly proportional to the potential of the circuit and inversely proportional to a characteristic of the impedance of a portion of the circuit.

4. Electric circuit protective apparatus comprising a movable member and actuating means therefor comprising a winding connected to be energized in accordance with the potential of the circuit and means arranged to cooperate with said winding and connected to be energized in accordance with the difference between a current proportional to the circuit current and a current dependent on the potential of the circuit and a characteristic of the impedance of a portion of the circuit.

5. In combination with an electric circuit, a relay comprising a movable member and actuating means therefor comprising a plurality of cooperating windings connected and arranged to actuate the member in accordance with the product $E\left(I - \dfrac{E}{x}\right)$ where E and I represent respectively the potential and the current of the circuit and $x$ the inductance of a section of the circuit.

6. In combination with a section of an electric circuit, a relay comprising a movable member and means for actuating the member comprising a winding connected to be energized in accordance with the potential of the circuit and a cooperating means connected to be energized in accordance with the difference between the circuit current and a current dependent on the potential of the circuit and an impedance characteristic of said section.

7. Electric circuit protective apparatus comprising a movable member and actuating means therefor comprising a winding connected to be energized from the circuit, a cooperating winding, and in series relation therewith a device having an impedance characteristic proportioned in accordance with the corresponding characteristic of a portion of the circuit, the cooperating winding and the impedance being connected to be energized in accordance with the potential of the circuit.

8. In combination with an electric circuit, a relay comprising a movable member and actuating means therefor comprising a plurality of cooperating windings connected and arranged to actuate the member in accordance with the product $E\left(I-\dfrac{E}{w}\right)$ where $E$ and $I$ represent respectively the potential and the current of the circuit, and $w$ a characteristic of the impedance of a portion of the circuit.

9. Electric circuit protective apparatus comprising a movable member and actuating means therefor comprising a winding connected to be energized in accordance with the potential of the circuit, a cooperating winding, and in series relation therewith a device having an impedance characteristic which is proportioned in accordance with the corresponding characteristic of a portion of the circuit, said cooperating winding and said device being connected to be energized in accordance with a potential of the circuit.

10. A protective system comprising a sectionalized line, circuit controlling means for a line section, and a directional relay for controlling said circuit controlling means, said relay comprising current and potential windings for effecting operation of the relay in one direction when the power flow is in one direction and means for controlling the direction of operation of the relay in accordance with the value of a characteristic of the impedance of the circuit between the relay and a point of fault on the line when the power flow is in the other direction.

11. A protective system comprising a sectionalized line, circuit controlling means for a line section and a relay for controlling said circuit controlling means; said relay being provided with cooperating windings connected to actuate the relay in one direction or the other, dependent upon the ratio of a characteristic of the impedance of a predetermined length of line to a characteristic of the impedance of the line between a given point and a point of fault.

In witness whereof, I have hereunto set my hand this 3rd day of February, 1926.

OTTO MAYR.